(12) United States Patent
Allen

(10) Patent No.: US 6,905,053 B2
(45) Date of Patent: Jun. 14, 2005

(54) RACK TOWER

(75) Inventor: Scott R. Allen, Fieldbrook, CA (US)

(73) Assignee: Watermark PaddleSports, Inc., Arcata, CA (US)

( * ) Notice: Subject to any disclaimer, the term of this patent is extended or adjusted under 35 U.S.C. 154(b) by 0 days.

(21) Appl. No.: 10/407,841

(22) Filed: Apr. 4, 2003

(65) Prior Publication Data
US 2004/0134951 A1 Jul. 15, 2004

Related U.S. Application Data

(63) Continuation of application No. PCT/US03/00864, filed on Jan. 10, 2003.

(51) Int. Cl.⁷ .................................................. B60R 9/04
(52) U.S. Cl. .................... 224/321; 224/326; 224/315; 224/322
(58) Field of Search ................................ 224/309, 315, 224/321, 322, 323, 326, 327, 330, 331, 558, 570; 248/222.12

(56) References Cited

U.S. PATENT DOCUMENTS

| 4,401,247 | A | 8/1983 | Zoor |
| 4,406,386 | A | 9/1983 | Rasor et al. |
| 4,640,450 | A | 2/1987 | Gallion et al. |
| 5,170,920 | A | 12/1992 | Corrente et al. |
| 5,282,562 | A | 2/1994 | Legault |
| 5,326,007 | A | 7/1994 | Pudney et al. |
| 5,385,285 | A | 1/1995 | Cucheran et al. |
| 5,400,938 | A | 3/1995 | Kolodziej et al. |
| 5,452,831 | A | 9/1995 | Linnhoff |
| 5,577,650 | A | 11/1996 | Stapleton |
| 6,010,048 | A | 1/2000 | Settelmayer |
| 6,050,467 | A | 4/2000 | Drouillard et al. |
| 6,305,589 | B1 | 10/2001 | Chimenti et al. |

*Primary Examiner*—Nathan J. Newhouse
(74) *Attorney, Agent, or Firm*—Kolisch Hartwell, P.C.

(57) ABSTRACT

A tower device for securing a crossbar on a vehicle includes a base portion, a tower portion, and a pivotal cover member.

22 Claims, 3 Drawing Sheets

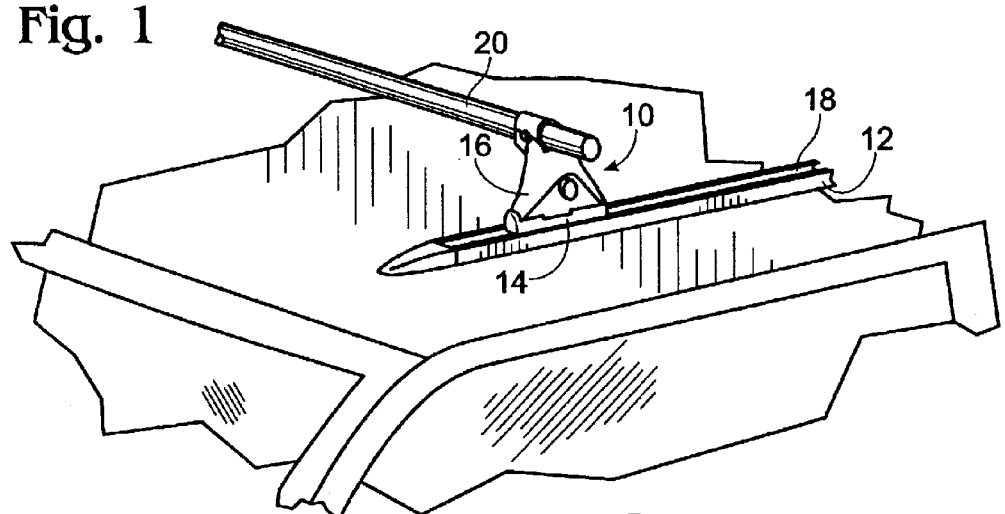

RACK TOWER

CROSS-REFERENCE TO RELATED APPLICATION

This application is a continuation of PCT Application No. PCT/US03/00864 filed Jan. 10, 2003 titled "Rack Tower", which is hereby incorporated by reference in its entirety.

TECHNICAL FIELD

The present invention relates to a sports equipment rack for a vehicle. More particularly, the present invention provides a rack tower configured to be attached to a vehicle roof rail.

BACKGROUND OF THE INVENTION

Sports equipment racks for vehicles typically include one or more crossbars configured to extend across a vehicle roof for supporting recreational equipment items over the roof. Typically, each crossbar is attached to the car roof via a pair of towers. The towers serve both to couple the crossbar to the vehicle, and to support the crossbars over the vehicle roof so that the crossbars do not contact the roof.

Many different types of rack towers are known, and may be configured to be attached to a vehicle roof in any of a number of different ways. For example, some rack towers are configured to be attached to vehicle roof rails. Roof rails are long, narrow, rail-shaped devices mounted to the roofs of many vehicles, often by the vehicle manufacturer. A vehicle with roof rails typically has a plurality of rails that run at least partially along the length of the roof in a parallel relation to one another. Roof rails generally include a slotted track that contains one or more mounts or connectors. These connectors are typically configured to accept a fastener, such as a bolt, to allow the attachment of items such as rack towers to the roof rail, and thus to the vehicle.

Rack towers that mount to roof rails offer some advantages over other types of towers. For example, these towers may be mounted to vehicles that lack rain gutters or other features commonly used for mounting rack towers. Also, these towers typically are supported completely by the roof rails, and do not otherwise touch the vehicle roof.

However, known rack towers for mounting to a roof rail may also present some shortcomings. For example, these towers are typically configured to remain at a fixed angle to the roof once the tower is adjusted for a particular roof. In this situation, a user may need to exercise care when mounting or removing the rack from the vehicle roof to avoid damaging the roof rails by lifting one tower while the other is attached to the vehicle. Also, the bolts used to mount the towers to the fasteners inside the rail slots are typically not accessible when the tower portion is mounted to the base portion. In this case, the tower portions typically must be removed from the base portions to adjust the position of the rack on the vehicle roof.

Additionally, the hardware used to tighten the tower onto a crossbar is often located in a position that may be difficult to adjust once the tower portion is mounted to the base. Furthermore, this hardware may be exposed to highway dirt or dust, which may clog the hardware and make the tower more difficult to adjust.

DISCLOSURE OF THE INVENTION

The present invention provides a rack tower configured to be mounted to a roof rail of a vehicle that may avoid the problems encountered with conventional towers. The advantages of the present invention will be understood more readily after a consideration of the drawings and the Detailed Description of the Preferred Embodiments.

BRIEF DESCRIPTION OF THE DRAWINGS

FIG. 1 is partial view of a vehicle roof, showing a rack tower according to a first embodiment of the present invention attached to a roof rail.

FIG. 2 is a partially exploded isometric view of the embodiment of FIG. 1.

DETAILED DESCRIPTION OF THE PREFERRED EMBODIMENTS

Figure 3:
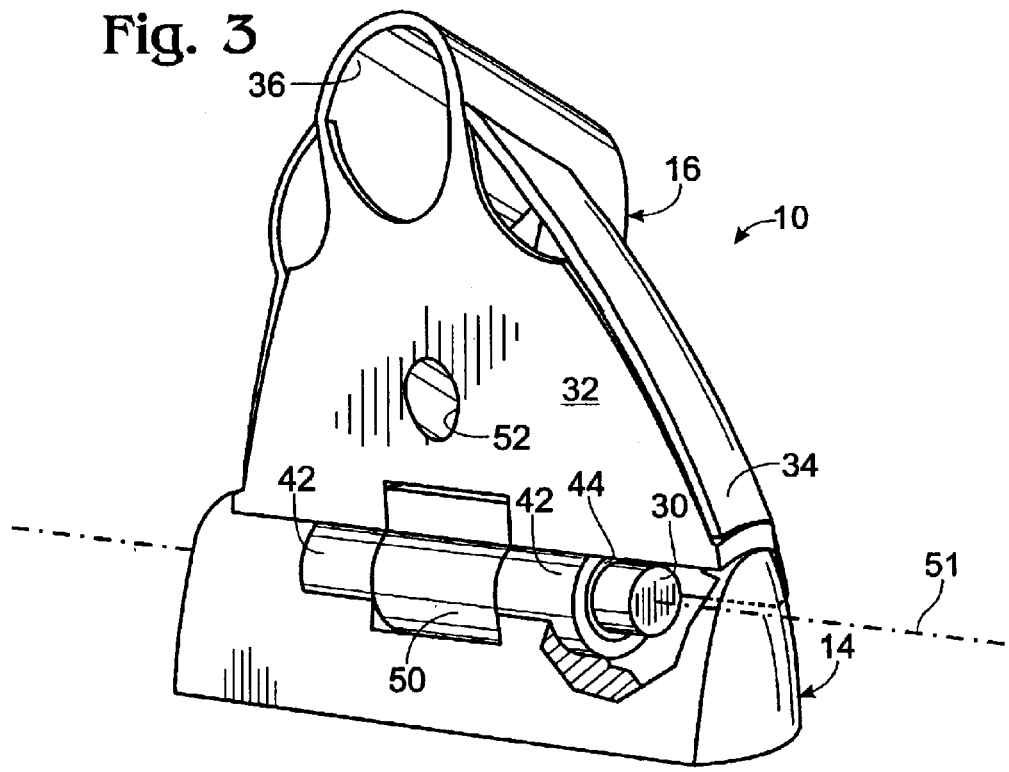
FIG. 3 is a partially broken-away perspective view of the embodiment of FIG. 1, with the tower cover closed and the locking pins in the extended position.

FIG. 1 shows, generally at 10, a rack tower according to a first embodiment of the present invention, coupled to a vehicle roof rail 12. Rack tower 10 includes a base 14 and a tower portion 16. Base 14 is configured to be mounted to one or more connectors disposed within a slot 18 formed in roof rail 12. Tower portion 16 is configured to be coupled to base 14, and also to retain a crossbar 20, to thus couple the crossbar to the vehicle.

FIG. 2 shows the construction of rack tower 10 in more detail. Base 14 includes one or more bolt holes 22 (two are shown) configured to accept bolts 24 to secure the base to the connectors disposed within slot 18 of roof rail 12. Base 14 also includes an inner surface 26 against which tower portion 16 may rest when coupled to base 14. Inner surface 26 is typically configured to have a shape complementary to the shape of the bottom surface of tower portion 16. In the depicted embodiment, inner surface 26 has a continuously curved shape that allows tower portion 16 to pivot relative to base 14, as described in more detail below. This allows one side of crossbar 20 to be lifted without damaging the roof rail to which the other side of the crossbar is attached, and also allows crossbar 20 to be more easily adapted for use on roofs of different profiles. However, it will be appreciated that inner surface 26 may have any other suitable shape without departing from the scope of the present invention.

Base 14 also includes a pair of recesses 28. Recesses 28 are configured to receive of a pair of complementary locking pins 30 that are movably coupled to tower portion 16. Locking pins 30 are movable between a retracted position, in which the locking pins do not extend into recesses 28, and an extended position, in which the locking pins do extend into the recesses. This allows tower portion 16 to be mounted to base 14 simply by resting the tower portion against inner surface 26 of base 14, and then moving locking pins 30 into recesses 28. Likewise, tower portion 16 may be removed from base 14 simply by moving locking pins 30 out of recesses 28, and then removing the tower portion from the base. The operation of locking pins 30 is described in more detail below.

Tower portion 16 includes a body 32 and a tower cover 34. Body 32 typically includes an aperture 36 configured to accommodate crossbar 20, and also may include a wedge 38 that is adjustable via bolt 40 to grip or clamp crossbar 20 within aperture 36.

Body 32 also includes a pair of generally cylindrical locking pin mounts 42. The depicted locking pin mounts 42 have a generally curved shape that is configured to be complementary to the shape of inner surface 26 of base 14 to facilitate the pivoting of tower portion 16 on the base. However, the locking pin mounts 42 may have any other suitable shape without departing from the scope of the present invention.

Locking pin mounts 42 are each configured to hold a locking pin sleeve 44 firmly in position relative to body 32. As shown in FIG. 2, one locking pin sleeve 44 is shown separate from body 32, while the other locking pin sleeve 44 is shown positioned within locking pin mount 42. Each locking pin sleeve 44 has a threaded inner surface that is complementary to threads 46 formed in each locking pin 30. The interaction of threads 46 on locking pins 30 with the threads on the inner surfaces of locking pin sleeves 44 causes locking pins 30 to move linearly along their axis of rotation 51 relative to locking pin sleeves 44 when the locking pins are rotated. Thus, locking pins 30 can be made to retract into or extend out of locking pin sleeves 44 by rotating the locking pins with respect to the locking pin sleeves.

The rotation of locking pins 30 may be accomplished by causing locking pins 30 to rotate with movements of tower cover 34. To accomplish this, tower cover 34 includes a downwardly extending locking pin bracket 48. Locking pin bracket 48 is configured to accommodate a flattened (or otherwise shaped) portion 49 at the end of each locking pin 30. Locking pin bracket 48 is also configured to allow locking pins 30 to slide linearly along the inner surfaces of the bracket, but not to rotate with respect to the bracket.

Figure 4:
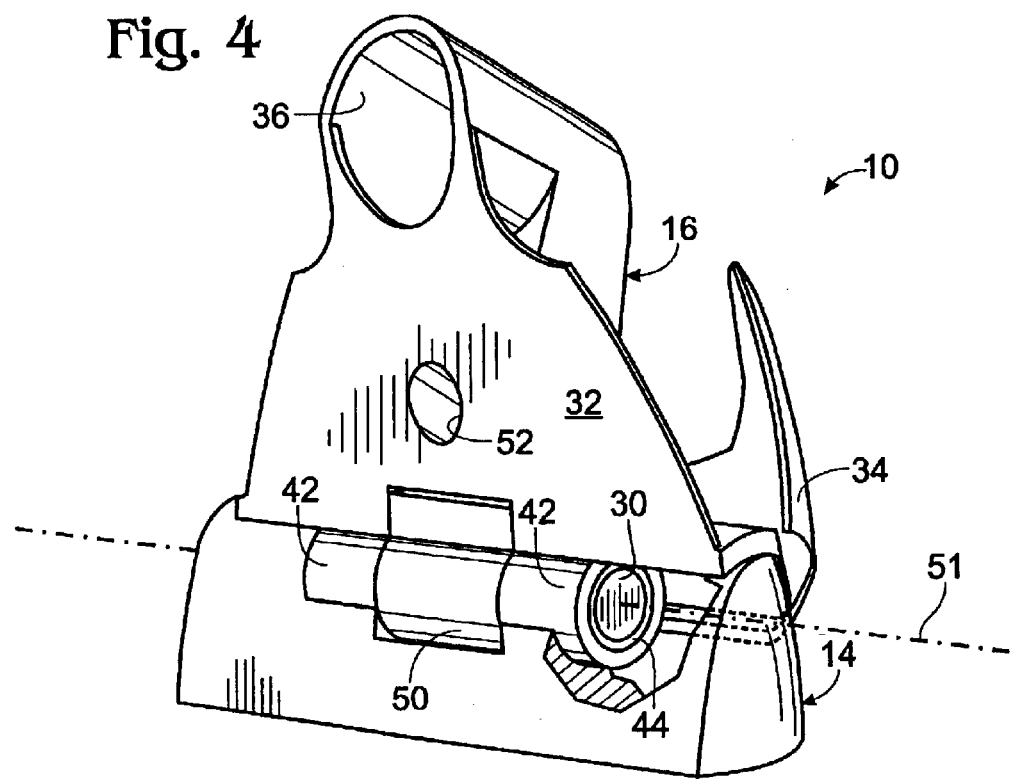
FIG. 4 is a partially broken-away perspective view of the embodiment of FIG. 1, with the tower cover open and the locking pins in the retracted position.
Figure 5:
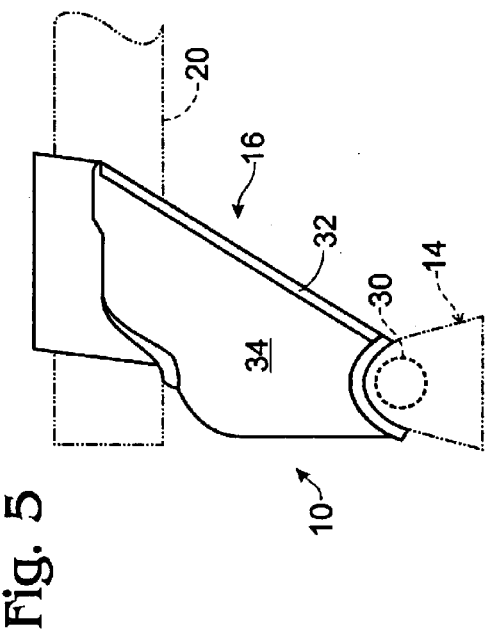
FIG. 5 is a side view of the embodiment of FIG. 1, with the tower cover closed.
Figure 6:
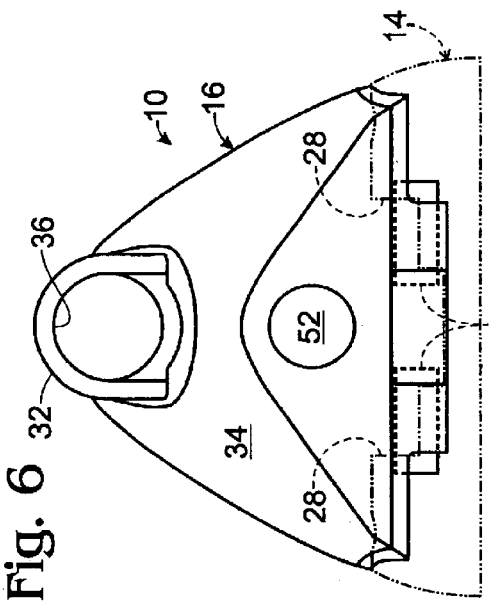
FIG. 6 is a front view of the embodiment of FIG. 1, with the tower cover closed and the locking pins engaged with the base.
Figure 7:
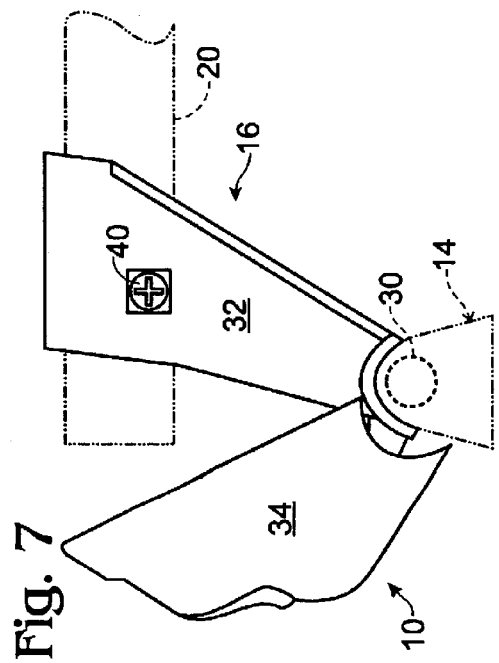
FIG. 7 is a side view of the embodiment of FIG. 1, with the tower cover open.
Figure 8:
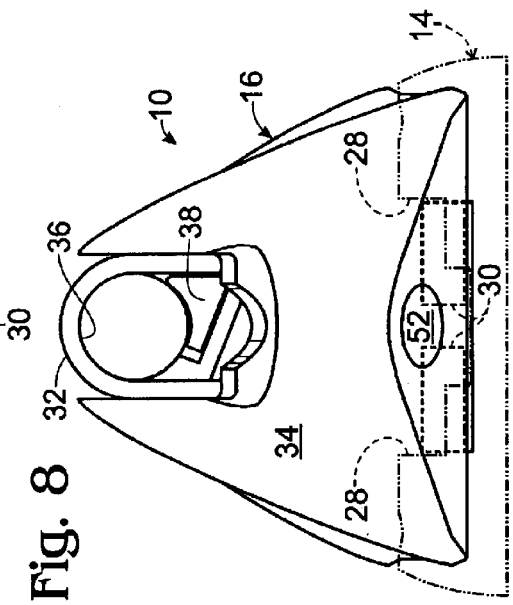
FIG. 8 is a front view of the embodiment of FIG. 1, with the tower cover open and the locking pins disengaged from the base.

A bracket cover 50 configured to snap onto the bracket may be used to retain ends 49 of locking pins 30 within the bracket. Bracket cover 50 may include a lower surface complementary in shape to the inner surface 26 of base 14. This, combined with the ability of locking pins 30 to rotate within locking pin sleeves 44, allows tower cover 34 to be pivoted between an open position and a closed position with respect to body 32. Tower cover 34 pivots along an axis of rotation 51 that extends generally through both locking pins 30. The closed position is illustrated in FIGS. 3, 5 and 6, and the open position is illustrated in FIGS. 4, 7 and 8. The base is shown in phantom in FIGS. 5–8, while the positions of locking pins 30 are indicated in dashed lines in these Figs.

The operation of rack tower 10 is illustrated in more detail in FIGS. 3–8. FIGS. 3–4 show operation of the rack tower from a perspective view, and FIGS. 5–8 show the operation of the rack tower from side and front views. Initially, when tower cover 34 is in the closed position, locking pins 30 are in the extended position, and extend into recesses 28 in base 14. However, when tower cover 34 is pivoted away from body 32, bracket 48 causes locking pins 30 to rotate along with the tower cover 34. The threads within locking pin sleeves 44 then cause locking pins 30 to retract into the sleeves as the locking pins rotate. Locking pins 30 may retract completely into locking pin sleeves 44 when tower cover 34 is opened far enough, as shown in FIG. 4. This allows tower portion 16 to be easily removed from base 14. Likewise, tower portion 16 may be coupled to base 14 simply by placing the tower portion 16 upon inner surface 26 of base while tower cover 34 is in the open position, and then pivoting the tower cover to the closed position.

Besides providing for the quick attachment of tower portion 16 to base 14, the use of tower cover 34 also offers other advantages over conventional rack towers. For example, tower cover 34 covers much of the hardware used to mount and adjust rack tower 10 when in the closed position. Thus, mounting bolts 24 and wedge adjustment bolt 40 are protected from contamination by road dust and dirt when tower cover 34 is closed. This may keep the bolts operating smoothly for a longer period of time compared to unprotected bolts.

Furthermore, referring again to FIG. 2, tower cover 34 may include a lock mount 52 configured to accept the attachment of a locking mechanism (not shown). When installed on rack tower 10, the locking mechanism may be locked by a user to prevent others from opening tower cover 34. Because mounting bolts 24 and wedge adjustment bolt 40 are completely covered when tower cover 34 is closed, locking the locking mechanism prevents the mounting or adjustment bolts from being tampered with, and thus may help to prevent the theft of rack tower 10 or crossbar 20. It will be appreciated that mounting bolts 24 and wedge adjustment bolt 40 are all easily accessible by a user when tower cover 34 is in the open position (mounting bolts 24 are accessible through access holes 54 in body 32), without any need to remove tower portion 16 from base 14.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

I claim:

1. A rack system for carrying items on a car equipped with a pair of rails on the top of the car, comprising
   at least one pair of support devices configured for mounting one support device on each rail and securing a crossbar between the support devices,
   each support device including a base portion configured for attachment to one of the rails, a tower portion having a holding mechanism for securing a portion of a crossbar, and a cover member that pivots between open and closed positions, wherein the cover member has a pivotal axis, the tower portion having one or more locking pins that extend in the direction of the pivotal axis when the cover member moves from the open to the closed position, and wherein pivoting of the cover member from the open position to the closed position causes locking engagement of the tower portion to the base portion.

2. The rack of claim 1, wherein the base portion has a fastening mechanism for securing the base portion to the rail, the fastening mechanism being accessible when the cover member is in the open position, and inaccessible when the cover member is in the closed position.

3. The rack of claim 1, wherein the tower portion can pivot relative to the base portion to accommodate varying car top slopes and configurations.

4. The rack of claim 1, wherein the base portion has one or more recesses, and wherein the locking pins move into engagement with the one or more recesses when the cover member moves from the open position to the closed position.

5. The rack of claim 1, further comprising
a locking device connected to the tower portion for permitting a user to lock the cover member in the closed position.

6. The rack of claim 1, wherein the holding mechanism includes a clamp device and an adjustment mechanism for tightening and loosening the clamp device relative to a crossbar.

7. The rack of claim 6, wherein the adjustment device is accessible when the cover member is open, and inaccessible when the cover member is closed.

8. The rack of claim 6, wherein the adjustment device is operable via a threaded member oriented generally perpendicular to the crossbar.

9. The rack of claim 6, wherein the adjustment device includes a threaded member impinging on a wedge member that contacts and clamps the crossbar when the threaded member is screwed into a hole in the tower portion.

10. A support device for securing a portion of a crossbar on the top of a car comprising
a base portion having an attachment mechanism for attaching the base portion to a rail on the top of a car,
a tower portion having a holding mechanism for securing a portion of a crossbar, and a cover member that is moveable between open and closed positions,
the base portion having one or more recesses, the tower portion having one or more locking pins that move into engagement with the one or more recesses when the cover member moves from the open position to the closed position.

11. The device of claim 10, further comprising
a locking device connected to the tower portion for permitting a user to lock the cover member in the closed position.

12. The device of claim 10, wherein the cover member pivots around an axis causing extension or retraction of the one or more locking pins into or out of the recesses.

13. The device of claim 10, wherein the base portion has a fastening mechanism for securing the base portion to the rail, the fastening mechanism being accessible when the cover member is in the open position, and inaccessible when the cover member is in the closed position.

14. A support device for securing a portion of a crossbar on the top of a car comprising
base portion having a length and a width, the length being longer than the width and a longitudinal axis extending parallel to the length, the base portion having a mechanism for attaching the base portion to a car,
a tower portion connected to the base portion, the tower portion having a clamp device configured for gripping a crossbar, and an adjustment mechanism for tightening and loosening the clamp device relative to the crossbar, the adjustment mechanism being operable via a threaded member oriented generally perpendicular to the crossbar and generally parallel to the longitudinal axis of the base portion.

15. The device of claim 14, wherein the tower portion has a cover member that pivots between open and closed positions, the adjustment device being accessible when the cover member is open in the open position and inaccessible when the cover member is in the closed position.

16. The device of claim 15 further comprising
a locking device connected to the tower portion for permitting a user to lock the cover member in the closed position.

17. A support device for securing a portion of a crossbar on the roof of a car comprising
a base portion having a fastening mechanism for attaching the base portion to a car,
a tower portion connected to the base portion, the tower portion having a holding mechanism for securing a portion of a crossbar, the tower portion being pivotal relative to the base portion to accommodate varying roof configurations,
wherein the tower portion has a cover member that pivots between open and closed positions, the fastening mechanism being accessible when the cover member is in the open position, and inaccessible when the cover member is in the closed position.

18. A rack system for carrying items on a car equipped with a pair of rails on the top of the car, comprising
at least one pair of support devices configured for mounting one support device on each rail and securing a crossbar between the support devices,
each support device including a base portion including a fastening mechanism for securing the base portion to the rail, a tower portion having a holding mechanism for securing a portion of a crossbar, and a cover member that pivots between open and closed positions, the fastening mechanism being accessible when the cover member is in the open position, and inaccessible when the cover member is in the closed position.

19. The rack system of claim 18, wherein pivoting of the cover member from the open position to the closed position causes locking engagement of the tower portion to the base portion.

20. A support device for securing a portion of a crossbar on the top of a car comprising
a base member having an attachment mechanism for attaching the base member to a rail on the top of a car,
a tower portion having a holding mechanism for securing a portion of a crossbar, and a cover member that is moveable between open and closed positions, the attachment mechanism being accessible when the cover member is in the open position, and inaccessible when the cover member is in the closed position.

21. The support device of claim 20, wherein movement of the cover member causes locking engagement of the tower portion to the base member.

22. A rack system for carrying items on a car equipped with a pair of rails on the top of the car, comprising
at least one pair of support devices configured for mounting one support device on each rail and securing a crossbar between the support devices,
each support device including a base portion configured for attachment to one of the rails, a tower portion having a holding mechanism for securing a portion of a crossbar, and a cover member that pivots between open and closed positions, the cover member having a pivotal axis, one or more locking pins disposed parallel to the pivotal axis, and one or more recesses disposed parallel to the pivotal axis, and wherein pivoting the cover member from the open position to the closed position causes locking engagement of the tower portion with the base portion by causing locking engagement of the locking pins with the recesses.

* * * * *